: US 6,680,830 B2
: Jan. 20, 2004

(12) United States Patent
Gill

(54) TUNNEL VALVE SENSOR AND FLUX GUIDE WITH IMPROVED FLUX TRANSFER THEREBETWEEN

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 09/873,062

(22) Filed: May 31, 2001

(65) Prior Publication Data
US 2002/0181166 A1 Dec. 5, 2002

(51) Int. Cl.[7] ................................................ G11B 5/39
(52) U.S. Cl. ....................................................... 360/321
(58) Field of Search .............................. 360/321, 324.2, 360/324.1, 324.11, 324.12

(56) References Cited

U.S. PATENT DOCUMENTS 5,617,276 A    4/1997  Takada et al. .............. 360/113
5,901,018 A    5/1999  Fontana, Jr. et al. ........ 360/104
5,930,084 A    7/1999  Dovek et al. ................ 360/113
6,519,124 B1 * 2/2003  Redon et al. ............ 360/324.2
6,597,546 B2 * 7/2003  Gill .............................. 360/321
2002/0135949 A1 * 9/2002  Gill .......................... 360/324.2
2002/0154452 A1 * 10/2002 Gill .............................. 360/321
2002/0181165 A1 * 12/2002 Gill .............................. 360/321

FOREIGN PATENT DOCUMENTS

WO    WO97/28528    7/1997    ............ G11B/5/39
WO    WO97/16823    9/1997    ............ G11B/5/31

* cited by examiner

Primary Examiner—George J. Letscher
(74) Attorney, Agent, or Firm—Ervin F. Johnston

(57) ABSTRACT

A tunnel valve sensor and flux guide has improved flux transfer therebetween by providing a magnetic oxide insulation layer which is located between and interfaces a back surface of the flux guide and a front surface of the tunnel valve sensor. Since this insulation layer has magnetic properties an increased amount of flux is transferred between the flux guide to the tunnel valve sensor for rotating a magnetic moment of a free layer in the tunnel valve sensor.

18 Claims, 4 Drawing Sheets

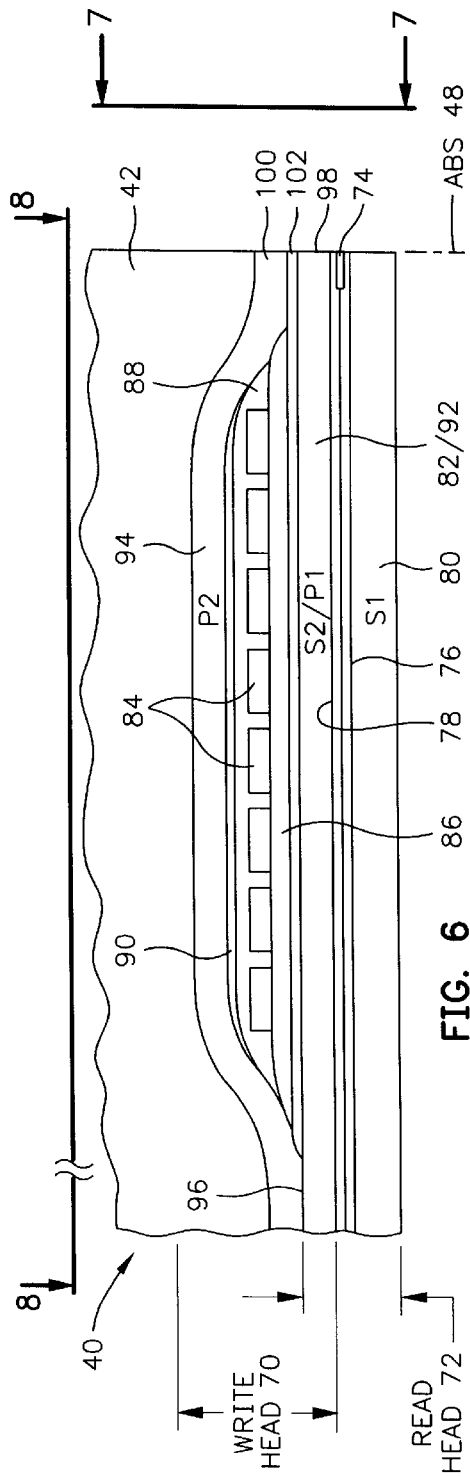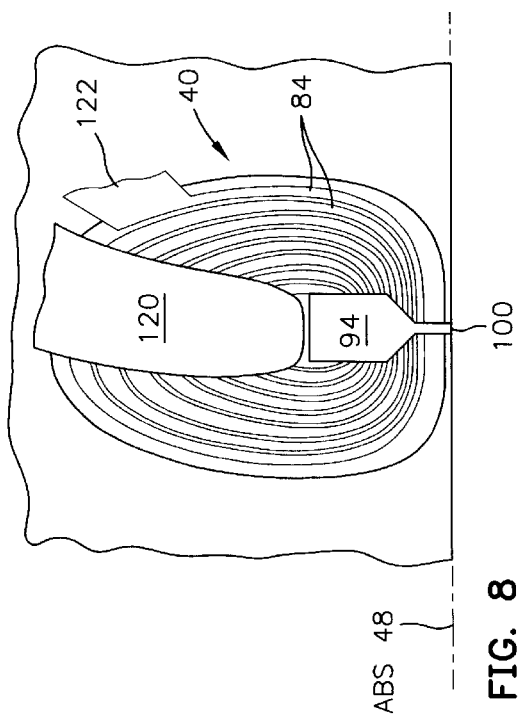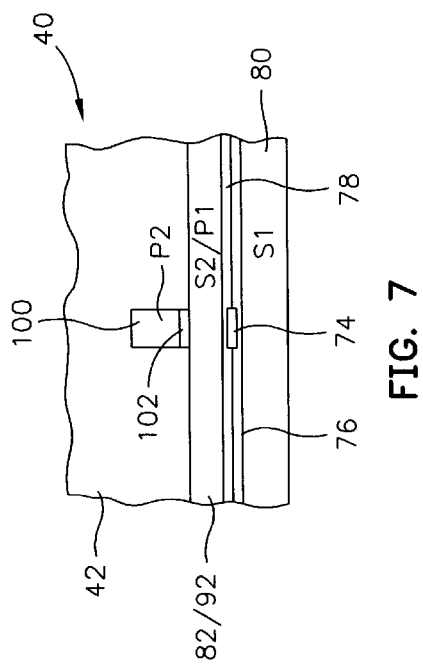

TUNNEL VALVE SENSOR AND FLUX GUIDE WITH IMPROVED FLUX TRANSFER THEREBETWEEN

BACKGROUND OF THE INVENTION

1. Field of the Invention

The present invention relates to a tunnel valve sensor and flux guide with improved flux transfer therebetween and, more particularly, to an electrically nonconductive magnetic oxide layer which is located between the tunnel valve sensor and the flux guide for permitting increased flux transfer therebetween.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a tunnel valve sensor for sensing the magnetic signal fields from the rotating magnetic disk. The sensor includes a nonmagnetic electrically nonconductive tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel valve sensor is located between ferromagnetic first and second shield layers. First and second leads, which may be the first and second shield layers, are connected to the tunnel valve sensor for conducting a tunneling current therethrough. The tunneling current is conducted perpendicular to the major film planes (CPP) of the sensor as contrasted to a spin valve sensor where a sense current is conducted parallel to the major film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is parallel to the ABS, is when the tunneling current is conducted through the sensor without magnetic field signals from the rotating magnetic disk.

When the magnetic moments of the pinned and free layers are parallel with respect to one another the resistance of the tunnel valve sensor to the tunneling current ($I_S$) is at a minimum and when their magnetic moments are antiparallel the resistance of the tunnel valve sensor to the tunneling current ($I_S$) is at a maximum. Changes in resistance of the tunnel valve sensor are a function of cos θ, where θ is the angle between the magnetic moments of the pinned and free layers. When the tunneling current ($I_S$) is conducted through the tunnel valve sensor, resistance changes, due to signal fields from the rotating magnetic disk, cause potential changes that are detected and processed as playback signals. The sensitivity of the tunnel valve sensor is quantified as magnetoresistive coefficient dr/R where dr is the change in resistance of the tunnel valve sensor from minimum resistance (magnetic moments of free and pinned layers parallel) to maximum resistance (magnetic moments of the free and pinned layers antiparallel) and R is the resistance of the tunnel valve sensor at minimum resistance. The dr/R of a tunnel valve sensor can be on the order of 40% as compared to 10% for a spin valve sensor.

The first and second shield layers may engage the bottom and the top respectively of the tunnel valve sensor so that the first and second shield layers serve as leads for conducting the tunneling current $I_S$ through the tunnel valve sensor perpendicular to the major planes of the layers of the tunnel valve sensor. The tunnel valve sensor has first and second side surfaces which intersect the ABS. First and second hard bias layers abut the first and second side surfaces respectively of the tunnel valve sensor for longitudinally biasing the free layer. This longitudinal biasing also helps to maintain the magnetic moment of the free layer parallel to the ABS when the read head is in the quiescent condition.

Magnetic head assemblies, wherein each magnetic head assembly includes a read head and a write head combination, are constructed in rows and columns on a wafer. After completion at the wafer level, the wafer is diced into rows of magnetic head assemblies and each row is lapped by a grinding process to lap the row to a predetermined air bearing surface (ABS). In a typical tunnel valve read head all of the layers are exposed at the ABS, namely first edges of each of the first shield layer, the seed layer, the free layer, the barrier layer, the pinned layer, the pinning layer and the second shield layer. Opposite edges of these layers are recessed in the head. The barrier layer is a very thin layer, on the order of 20 Å, which places the free and pinned layers very close to one another at the ABS. When a row of magnetic head assemblies is lapped there is a high risk of magnetic material from the free and pinned layers being smeared across the barrier layer at the ABS to cause a short therebetween. Accordingly, there is a strong-felt need to construct magnetic head assemblies with tunnel valve heads without the risk of shorting between the free and pinned layers at the ABS due to lapping.

A scheme for preventing shorts across the barrier layer of the tunnel valve sensor is to recess the tunnel valve sensor within the head and provide a flux guide between the ABS and the sensor for guiding flux signals from the rotating magnetic disk. In this scheme a tunnel valve sensor has front and back surfaces which are recessed from the ABS and the flux guide has a ferromagnetic flux guide body with front and back surfaces wherein the front surface forms a portion of the ABS and the back surface is magnetically coupled to the tunnel valve sensor. Located between and interfacing each of the back surface of the flux guide body and the front surface of the tunnel valve sensor is an electrically nonconductive insulation layer which is very thin, on the order of 8 Å, in order to permit flux transfer from the flux guide to the tunnel valve sensor. Additional insulation layers are located between the top and bottom surfaces of the flux guide and the shield layers to electrically insulate the flux guide from the shield layers when the shield layers are employed for conducting the tunneling current ($I_T$) to the tunnel valve sensor. These insulation layers can be made sufficiently thick so that when a row of magnetic head assemblies is lapped, as discussed hereinabove, there is no or minimum risk of conductive material being smeared between the layers to cause a short. The flux guide also permits a very narrow track width to be obtained by fabricating the flux guide with a narrow width at the ABS and increasing the width of the flux guide as it extends toward the tunnel valve sensor. With this arrangement the tunnel valve sensor can be maintained wide for reducing the resistance of the tunnel valve sensor to the tunneling current ($I_T$). Accordingly, the tunneling current ($I_T$) can be then increased for improving the signal response of the tunnel valve sensor.

A typical material employed for the insulation layer between the back surface of the flux guide and the front surface of the tunnel valve sensor is aluminum oxide ($Al_2O_3$). While this insulation layer is maintained relatively thin, as discussed hereinabove, a significant amount of flux cannot be transferred between the flux guide and the spin valve sensor because of the characteristics of aluminum oxide. Accordingly, there is a strong-felt need to improve the performance of the tunnel valve sensor and flux guide arrangement by improving the amount of flux transferred from the flux guide to the tunnel valve sensor.

SUMMARY OF THE INVENTION

The present invention provides an electrically nonconductive insulation layer between the back surface of the flux guide and the front surface of the tunnel valve sensor which permits improved flux transfer between the flux guide and the tunnel valve sensor. This is accomplished by making the insulation layer from a magnetic oxide. Suitable magnetic oxides are selected from the group consisting of nickel iron oxide (NiFeO), cobalt oxide (CoO), nickel oxide (NiO), cobalt iron oxide (CoFeO), nickel iron cobalt oxide (NiFeCoO) and iron hafnium oxide (FeHfO). In a preferred embodiment the insulation layer between the flux guide and the first shield layer is also a magnetic oxide so that this layer and the layer between the flux guide and the spin valve sensor can be sputter deposited simultaneously.

An object of the present invention is to provide a tunnel valve sensor and flux guide with improved flux transfer therebetween.

Another object is to provide an insulation layer between the flux guide and the tunnel valve sensor which permits improved flux transfer from the flux guide to the tunnel valve sensor.

A further object is to provide methods of making the aforementioned tunnel valve sensor and flux guide arrangements.

Other objects and attendant advantages of the invention will be appreciated upon reading the following description taken together with the accompanying drawings.

BRIEF DESCRIPTION OF THE DRAWINGS

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

DESCRIPTION OF THE PREFERRED EMBODIMENTS

Magnetic Disk Drive

Figure 1:
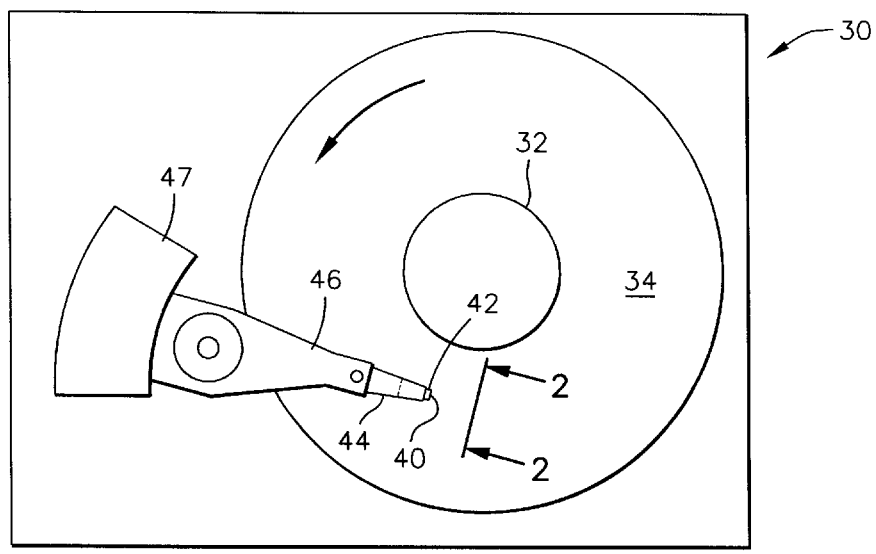
FIG. 1 is a plan view of an exemplary magnetic disk drive.
Figure 2:
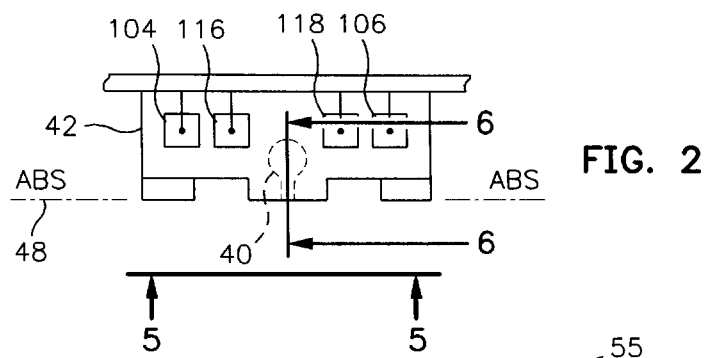
FIG. 2 is an end view of a slider with a magnetic head of the disk drive as seen in plane 2—2 of FIG. 1.
Figure 3:
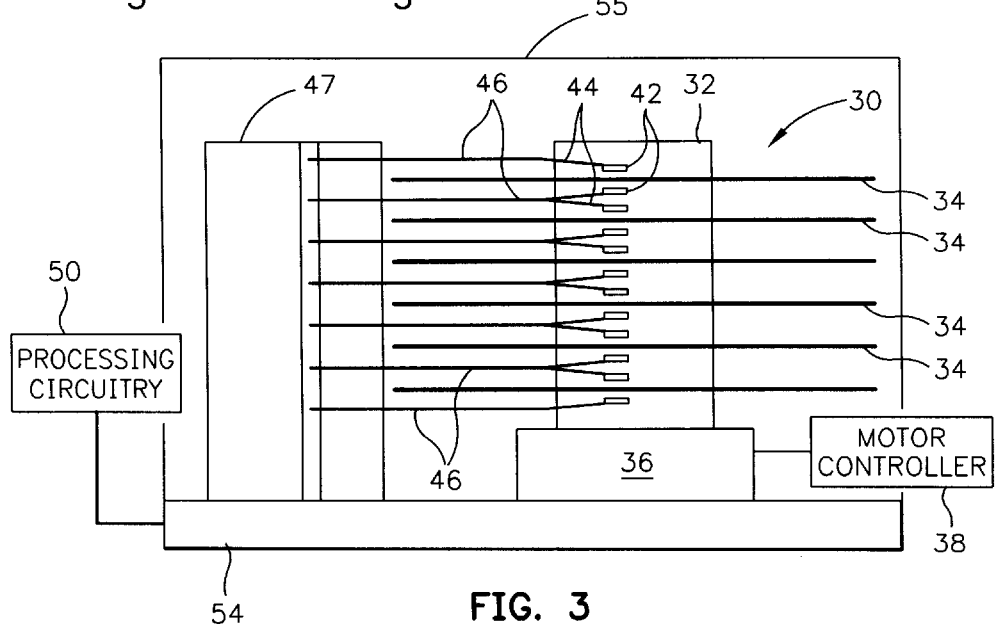
FIG. 3 is an elevation view of the magnetic disk drive wherein multiple disks and magnetic heads are employed.
Figure 4:
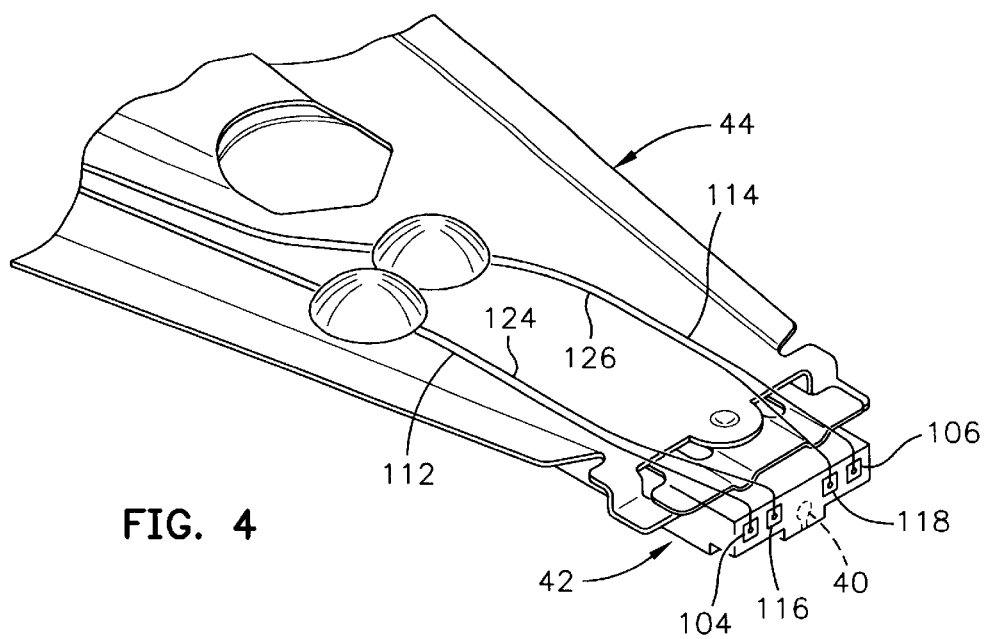
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
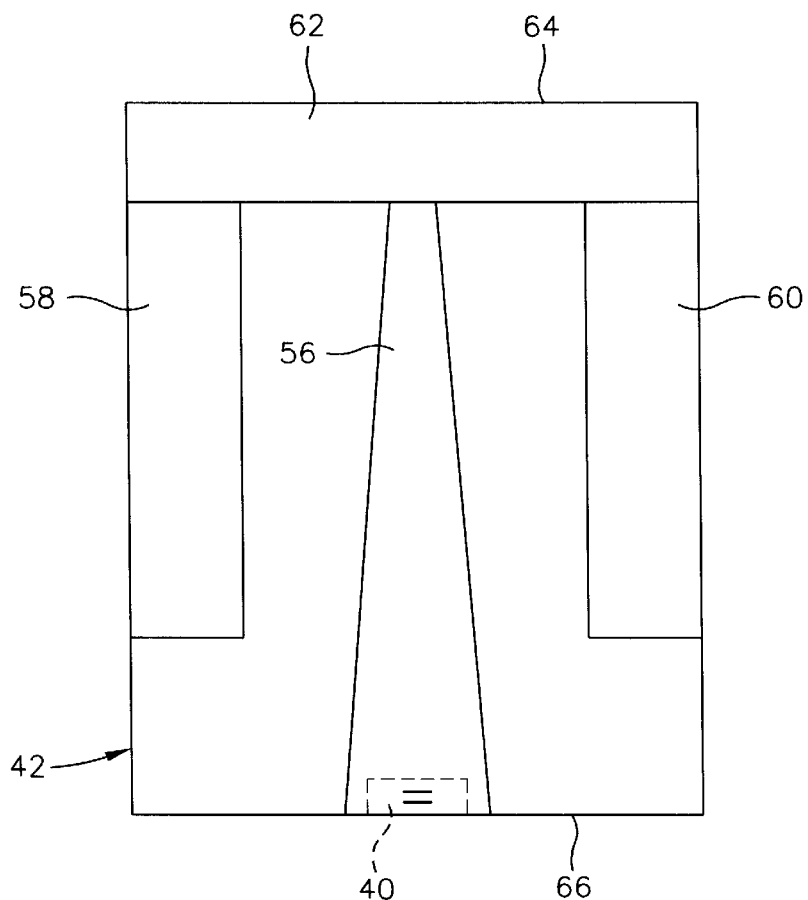
FIG. 5 is an ABS view of the slider taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a tunnel valve sensor 74 of the present invention. FIG. 7 is an ABS view of FIG. 6. The tunnel valve sensor 74 is sandwiched between ferromagnetic first and second shield layers 80 and 82. In response to external magnetic fields, the resistance of the tunnel valve sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel valve sensor 74 perpendicular to the planes of its film surfaces by the first and second shield layers 80 and 82 which serve as first and second leads. In a piggyback head (not shown) the second shield layer and the first pole piece layer are separate layers which are separated by a nonmagnetic isolation layer.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

The Invention

Figure 9:
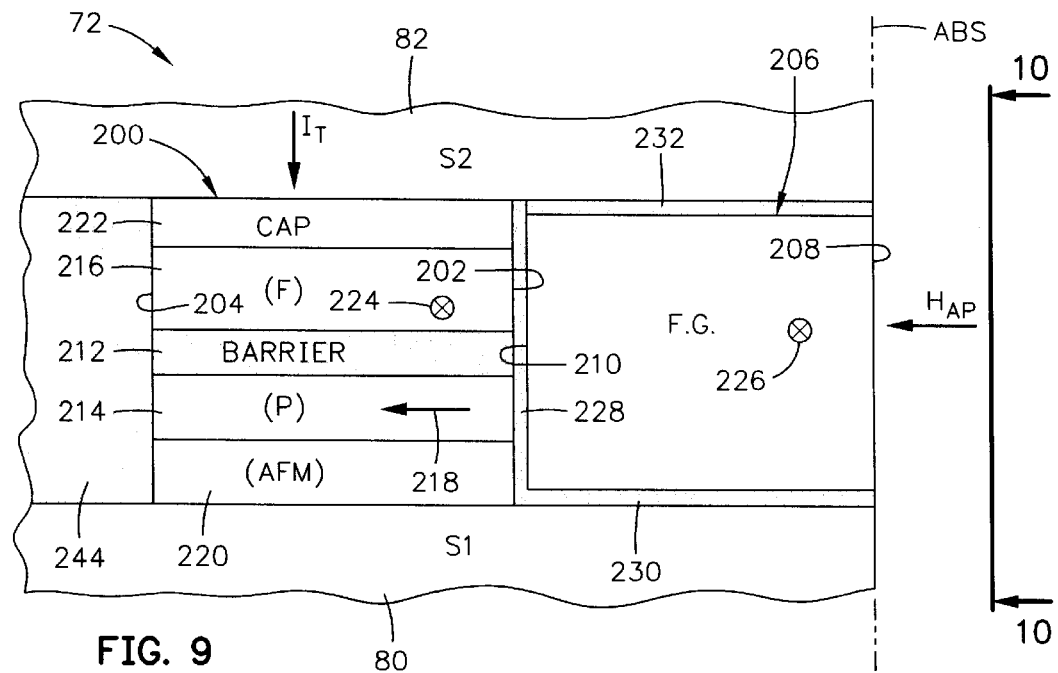
FIG. 9 is a longitudinal cross-sectional view of a tunnel valve sensor and flux guide combination.

FIG. 9 is a longitudinal cross-sectional view of the present read head 72 with a tunnel valve sensor 200 located between the ferromagnetic first and second shield layers 80 and 82. The tunnel valve sensor 200 has front and back surfaces 202 and 204 and is recessed in the head from the ABS. A ferromagnetic flux guide 206 has front and back surfaces 208 and 210 wherein the front surface 208 forms a portion of the ABS and the back surface 210 is magnetically coupled to the front surface 202 of the tunnel valve sensor 200.

The tunnel valve sensor has an electrically nonconductive barrier layer 212, such as aluminum oxide ($Al_2O_3$), located between a ferromagnetic pinned layer (P) 214 and a ferromagnetic free layer (F) 216. The pinned layer 214 has a magnetic moment 218 which is pinned by an electrically conductive antiferromagnetic (AFM) pinning layer 220 perpendicular to the ABS in a direction from left to right or from right to left, as shown in FIG. 9. A nonmagnetic electrically conductive cap layer 222 may be provided on top of the free layer 216 for protecting the sensor from subsequent processing steps. The free layer 216 has a magnetic moment 224 which is oriented parallel to the ABS and to the major planes of the layers. When a field signal $H_{AP}$ from a rotating magnetic disk is sensed by the tunnel valve sensor 200 the magnetic moment 224 of the free layer rotates. When the free layer 224 is rotated into the head by the field signal from the rotating magnetic disk the magnetic moments 224 and 218 become more parallel which reduces the resistance of the sensor to a tunneling current $I_T$ and when the field signal from the rotating magnetic disk rotates the magnetic moment 224 outwardly from the head, the magnetic moments 224 and 218 become more antiparallel which increases the resistance of the tunnel valve sensor to the tunneling current $I_T$. These resistance changes are processed as playback signals by the processing circuitry 50 in FIG. 3. The tunneling current $I_T$ may be conducted through the tunnel valve sensor by the first and second shield layers 80 and 82 which are electrically conductive. The connection of the source of the tunneling current $I_T$ to the first and second shield layers is not shown.

The flux guide has a magnetic moment 226 which is parallel to the magnetic moment 224. A very thin electrically nonconductive insulation layer 228 is located between and interfaces the back surface 210 of the flux guide and the front surface 202 of the tunnel valve sensor. By maintaining this insulation layer thin, on the order of 8 Å, flux can be transferred between the flux guide 206 and the spin valve sensor 200 so that a rotation of the magnetic moment 226 of the flux guide causes the magnetic moment 224 of the free layer to be rotated in a similar manner. A typical prior art material employed for the insulation layer 228 has been aluminum oxide ($Al_2O_3$) which is nonmagnetic and prevents a significant amount of flux from being transferred from the flux guide 206 to the tunnel valve sensor 200. The present invention improves the transfer of flux from the flux guide 206 to the tunnel valve sensor 200 by making the insulation layer 228 of a magnetic oxide. The magnetic oxide is preferably selected the group consisting of nickel iron oxide (NiFeO), cobalt oxide (CoO), nickel oxide (NiO), cobalt iron oxide (CoFeO), nickel iron cobalt oxide (NiFeCoO) and iron hafnium oxide (FeHfO). These materials provide electrical insulation between the flux guide 206 and the tunnel valve sensor 200 as well as permitting an improved amount of flux to be transferred from the flux guide to the tunnel valve sensor. With this arrangement the magnetic moment 224 will be more responsive and will follow more closely the rotation of the magnetic moment 226 of the flux guide. A preferred thickness of the magnetic oxide insulation layer 228 is 10 Å and may be in a range from 5 Å to 30 Å.

Figure 10:
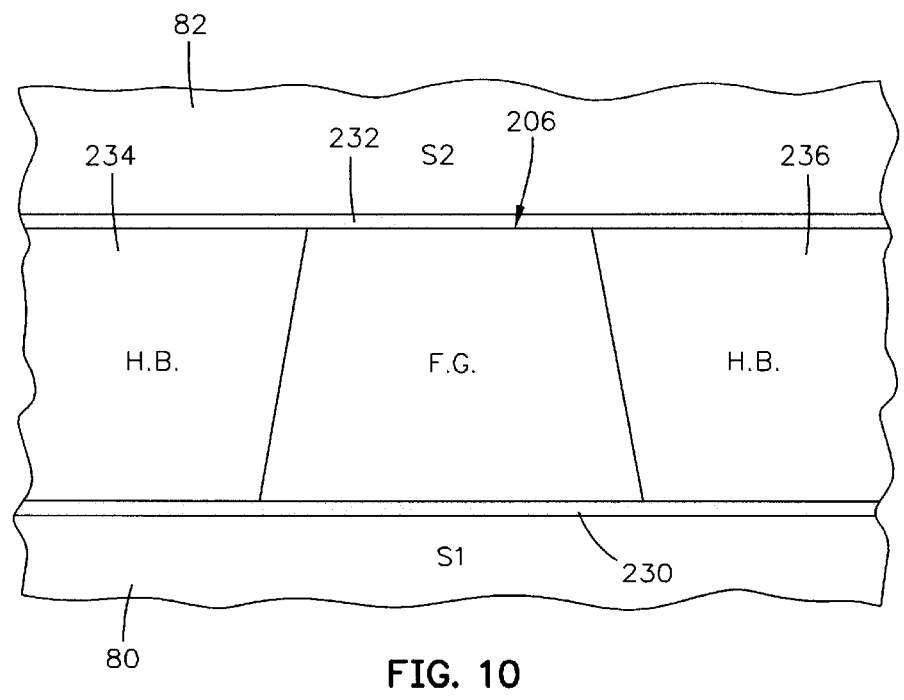
FIG. 10 is an ABS view taken along plane 10—10 of FIG. 9.

An electrically nonconductive insulation layer 230 is located between the first shield layer and the flux guide 206 and an electrically nonconductive insulation layer 232 is located between the flux guide and the second shield layer 82. Since the first and second shield layers 80 and 82 serve as leads for conducting the tunneling current ($I_T$) vertically through the tunnel valve sensor 200 the insulation layers 230 and 232 prevent the shield layers from shorting to the flux guide. The insulation layers 230 and 232 may be made sufficiently thick so that conductive material will not be smeared between the shield layers and the flux guide to cause a short therebetween. In a preferred embodiment the insulation layers 228 and 230 are fabricated from a magnetic oxide and are sputtered simultaneously to a desired thickness. The insulation layer 230 may be made additionally thick with magnetic oxide or some other material, such as aluminum oxide ($Al_2O_3$), by employing photolithography patterning techniques to maintain the desired thinness of the insulation layer 228. The insulation layer 232 may be any suitable electrically nonconductive insulation material, such as aluminum oxide ($Al_2O_3$). As shown in FIG. 10 first and second hard bias layers 234 and 236 may be provided for longitudinally biasing the flux guide 206 and may extend into the head (not shown) for biasing the free layer 216. First and second insulation layers (not shown), which may be the magnetic oxide, are then located between first and second side walls (not shown) of the sensor and the hard bias layers for electrically insulating therebetween.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic head assembly which has an air bearing surface (ABS), comprising:
   a read head including:
   a tunnel valve sensor recessed from the ABS and having front and back walls wherein the front wall is located between the ABS and the back wall;
   a flux guide having front and back walls wherein the front wall of the flux guide is located at the ABS and the back wall of the flux guide is located between the ABS and the front wall of the tunnel valve sensor;

an electrically nonconductive first insulation layer located between and interfacing the front wall of the tunnel valve sensor and the back wall of the flux guide; and the first insulation layer being a magnetic oxide.

2. A magnetic head assembly as claimed in claim 1 wherein the magnetic oxide is selected from the group consisting of NiFeO, CoO, NiO, CoFeO, NiFeCoO and FeHfO.

3. A magnetic head assembly as claimed in claim 2 wherein the read head further includes:

ferromagnetic first and second shield layers;

the tunnel valve sensor and the flux guide being located between the first and second shield layers; and electrically nonconductive second and third insulation layers located between the first shield layer and the flux guide and between the second shield layer and the flux guide respectively; and the second insulation layer also being said magnetic oxide.

4. A magnetic head assembly as claimed in claim 1 wherein the magnetic head assembly further comprises:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions.

5. A magnetic head assembly as claimed in claim 4 wherein the tunnel valve sensor includes:

a ferromagnetic pinned layer that has a magnetic moment;

an antiferromagnetic pinning layer exchange coupled to the pinned layer for pinning the magnetic moment of the pinned layer;

a ferromagnetic free layer that has a magnetic moment; and a nonmagnetic electrically insulative barrier layer located between the free layer and the pinned layer.

6. A magnetic head assembly as claimed in claim 5 wherein the read head further includes:

ferromagnetic first and second shield layers;

the tunnel valve sensor and the flux guide being located between the first and second shield layers; and electrically nonconductive second and third insulation layers located between the first shield layer and the flux guide and between the second shield layer and the flux guide respectively; and the second insulation layer also being said magnetic oxide.

7. A magnetic head assembly as claimed in claim 6 wherein the magnetic oxide is selected from the group consisting of NiFeO, CoO, NiO, CoFeO, NiFeCoO and FeHfO.

8. A magnetic disk drive including at least one magnetic head assembly that has a write head, a read head and an air bearing surface (ABS) comprising:

the write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

the read head including:

a tunnel valve sensor recessed from the ABS and having front and back walls wherein the front wall is located between the ABS and the back wall;

a flux guide having front and back walls wherein the front wall of the flux guide is located at the ABS and the back wall of the flux guide is located between the ABS and the front wall of the tunnel valve sensor;

an electrically nonconductive first insulation layer located between and interfacing the front wall of the tunnel valve sensor and the back wall of the flux guide; and the first insulation layer being a magnetic oxide.

a ferromagnetic first shield layer;

the tunnel valve sensor and the flux guide being located between the first shield layer and the first pole piece layer; and electrically nonconductive second and third insulation layers located between the first shield layer and the flux guide and between the second shield layer and the flux guide respectively;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

9. A magnetic disk drive as claimed in claim 8 wherein the magnetic oxide is selected from the group consisting of NiFeO, CoO, NiO, CoFeO, NiFeCoO and FeHfO.

10. A magnetic disk drive as claimed in claim 8 wherein the tunnel valve sensor includes:

a ferromagnetic pinned layer that has a magnetic moment;

an antiferromagnetic pinning layer exchange coupled to the pinned layer for pinning the magnetic moment of the pinned layer;

a ferromagnetic free layer that has a magnetic moment; and a nonmagnetic electrically insulative barrier layer located between the free layer and the pinned layer.

11. A magnetic disk drive as claimed in claim 10 wherein the magnetic oxide is selected from the group consisting of NiFeO, CoO, NiO, CoFeO, NiFeCoO and FeHfO.

12. A method of making a magnetic head assembly, which has an air bearing surface (ABS), comprising the steps of:

making a read head including the steps of:

forming a tunnel valve sensor recessed from the ABS and having front and back walls wherein the front wall is located between the ABS and the back wall;

forming a flux guide having front and back walls wherein the front wall of the flux guide is located at the ABS and the back wall of the flux guide is located between the ABS and the front wall of the tunnel valve sensor;

forming an electrically nonconductive first insulation layer between and interfacing the front wall of the tunnel valve sensor and the back wall of the flux guide; and forming the first insulation layer of a magnetic oxide.

13. A method as claimed in claim 12 wherein the magnetic oxide is formed from the group consisting of NiFeO, CoO, NiO, CoFeO, NiFeCoO and FeHfO.

14. A method as claimed in claim 13 wherein a making of the read head further includes the steps of:

forming ferromagnetic first and second shield layers;

forming the tunnel valve sensor and the flux guide between the first and second shield layers; and forming electrically nonconductive second and third insulation layers between the first shield layer and the flux guide and between the second shield layer and the flux guide respectively; and forming the second insulation layer also of said magnetic oxide.

15. A method as claimed in claim 12 wherein the making of the magnetic head assembly further comprises the steps of:

forming a write head including the steps of:

forming ferromagnetic first and second pole piece layers that have a yoke portion located between a pole tip portion and a back gap portion;

forming a nonmagnetic write gap layer between the pole tip portions of the first and second pole piece layers;

forming an insulation stack with at least one coil layer embedded therein between the yoke portions of the first and second pole piece layers; and connecting the first and second pole piece layers at their back gap portions.

16. A method as claimed in claim 15 wherein the tunnel valve sensor is made comprising the steps of:

forming a ferromagnetic pinned layer that has a magnetic moment;

forming an antiferromagnetic pinning layer exchange coupled to the pinned layer for pinning the magnetic moment of the pinned layer;

forming a ferromagnetic free layer that has a magnetic moment; and forming a nonmagnetic electrically insulative barrier layer located between the free layer and the pinned layer.

17. A method as claimed in claim 16 wherein a making of the read head further includes the steps of:

forming ferromagnetic first and second shield layers;

forming the tunnel valve sensor and the flux guide between the first and second shield layers; and forming electrically nonconductive second and third insulation layers between the first shield layer and the flux guide and between the second shield layer and the flux guide respectively; and forming the second insulation layer also of said magnetic oxide.

18. A method as claimed in claim 17 wherein the magnetic oxide is formed from the group consisting of NiFeO, CoO, NiO, CoFeO, NiFeCoO and FeHfO.

* * * * *